United States Patent
Korhonen et al.

(10) Patent No.: US 11,399,354 B2
(45) Date of Patent: Jul. 26, 2022

(54) CONTROLLED SYNCHRONIZATION GROUP SELECTION

(71) Applicant: NOKIA TECHNOLOGIES OY, Espoo (FI)

(72) Inventors: Juha S. Korhonen, Espoo (FI); Cassio Ribeiro, Espoo (FI)

(73) Assignee: NOKIA TECHNOLOGIES OY, Espoo (FI)

(*) Notice: Subject to any disclaimer, the term of this patent is extended or adjusted under 35 U.S.C. 154(b) by 428 days.

(21) Appl. No.: 15/643,085

(22) Filed: Jul. 6, 2017

(65) Prior Publication Data

US 2017/0374634 A1 Dec. 28, 2017

Related U.S. Application Data

(63) Continuation of application No. 14/651,905, filed as application No. PCT/IB2014/058361 on Jan. 17, 2014, now abandoned.
(Continued)

(51) Int. Cl.

| H04W 56/00 | (2009.01) |
|---|---|
| H04W 4/08 | (2009.01) |
| H04W 72/00 | (2009.01) |
| H04W 72/04 | (2009.01) |
| H04J 3/06 | (2006.01) |

(52) U.S. Cl.
CPC ......... *H04W 56/002* (2013.01); *H04J 3/0679* (2013.01); *H04W 4/08* (2013.01); *H04W 56/001* (2013.01); *H04W 56/0015* (2013.01); *H04W 72/005* (2013.01); *H04W 72/042* (2013.01)

(58) Field of Classification Search
None
See application file for complete search history.

(56) References Cited

U.S. PATENT DOCUMENTS 7,793,002 B2 * 9/2010 Hieb ................... H04L 67/1095
709/248
2006/0234756 A1 * 10/2006 Yamasaki ............. H04W 48/20
455/525
(Continued)

FOREIGN PATENT DOCUMENTS

| EP | 2 131 511 A2 | 12/2009 |
| EP | 3026966 A1 | 6/2016 |

(Continued)

OTHER PUBLICATIONS

Japanese Decision of Rejection application No. 2015-553213 dated Mar. 3, 2017.
(Continued)

*Primary Examiner* — Ayaz R Sheikh
*Assistant Examiner* — Faiyazkhan Ghafoerkhan
(74) *Attorney, Agent, or Firm* — Squire Patton Boggs (US) LLP

(57) ABSTRACT

Methods, apparatuses, and computer program products for synchronization in a network are provided. One method includes configuring a first node for joining a first synchronization group with a second node on a lowest stratum, receiving at least one synchronization signal comprising information on at least an identity of the second node, and synchronizing the first node to the first synchronization group based on the synchronization signal.

14 Claims, 6 Drawing Sheets

Related U.S. Application Data

(60) Provisional application No. 61/754,269, filed on Jan. 18, 2013.

(56) References Cited

U.S. PATENT DOCUMENTS

| | | | | |
|---|---|---|---|---|
| 2009/0262710 A1* | 10/2009 | Doi | H04W 56/001 | 370/336 |
| 2009/0307336 A1* | 12/2009 | Hieb | H04W 56/002 | 709/220 |
| 2010/0054216 A1* | 3/2010 | Usami | H04W 48/16 | 370/337 |
| 2010/0316043 A1* | 12/2010 | Doi | H04L 27/0006 | 370/350 |
| 2012/0135781 A1* | 5/2012 | Lu | H04W 36/0061 | 455/525 |
| 2012/0264430 A1* | 10/2012 | Kim | H04W 88/04 | 455/436 |
| 2013/0010668 A1* | 1/2013 | Lin | H04W 56/0015 | 370/312 |
| 2013/0044659 A1* | 2/2013 | Jokimies | H04W 52/0274 | 370/311 |
| 2013/0070601 A1* | 3/2013 | Shen | H04W 76/15 | 370/255 |
| 2013/0122822 A1* | 5/2013 | Srinivasan | H04L 27/26 | 455/67.13 |
| 2013/0185373 A1* | 7/2013 | Vandwalle | H04L 67/104 | 709/208 |
| 2014/0204847 A1* | 7/2014 | Belleschi | H04W 76/14 | 370/329 |
| 2015/0319723 A1* | 11/2015 | Korhonen | H04W 56/001 | 370/350 |
| 2015/0334555 A1* | 11/2015 | Seo | H04W 4/70 | 370/254 |

FOREIGN PATENT DOCUMENTS

| | | | |
|---|---|---|---|
| JP | 2002-165269 A | 6/2002 | |
| JP | 2008-109550 A | 5/2008 | |
| JP | 2011-182021 A | 9/2011 | |
| JP | 2015-23541 A | 2/2015 | |
| WO | 2011/050539 A1 | 5/2011 | |
| WO | 2011097770 A1 | 8/2011 | |
| WO | 2013106711 A1 | 7/2013 | |

OTHER PUBLICATIONS

Japanese Office Action Notification of Ground of Rejection application No. 2015-553213 dated Jul. 25, 2016.
European Search Report with an European Search Opinion and an Annex to the European Search Report application No. 14740703.5 dated Aug. 19, 2016.
International Search Report dated Apr. 29, 2014, issued in corresponding PCT Application No. PCT/IB2014/058361.
3GPP TSG RAN WG2 Meeting #67bis, R2-095423, "Support for time and frequency synchronization using network listening", Miyazaki, Japan, Oct. 12-16, 2009.
3GPP TSG RAN WG4 Meeting #52, R4-093465, "Support for time and frequency synchronization using network listening", Shenzhen, China, Aug. 24-28, 2009.
3GPP TSG RAN WG2 Meeting #67bis, R2-096000, "Scenarios and requirements of TDD HeNB air interface syncronization", Oct. 12-16, 2009, Miyazaki, Japan.
3GPP TSG RAN WG1 Meeting #75, R21-135398, "Clarification on D2D Synchronization procedure", San Francisco, USA, Nov. 11-15, 2013.
Chinese Office Action dated Jun. 1, 2017, issued in corresponding CN Application No. 201480005290.7. (English language translation attached).
European Search Report Application No. 17161421.7 dated Sep. 22, 2017.
Japanese Office Action and its English Language Translation dated May 21, 2018, issued in corresponding JP Application No. 2017-116512.
Notification of Second Office Action dated Mar. 7, 2018 corresponding to Chinese Patent Application No. 2014800052907, and English translation thereof.
Communication pursuant to Article 94(3) EPC issued in corresponding European Patent Application No. 17 161 421.7, dated Oct. 9, 2019.
Communication pursuant to Article 94(3) EPC issued in corresponding European Patent Application No. 17 161 421.7 dated Mar. 5, 2021.

* cited by examiner

CONTROLLED SYNCHRONIZATION GROUP SELECTION

CROSS REFERENCE TO RELATED APPLICATIONS

This application is a continuation of co-pending U.S. patent application Ser. No. 14/651,905 filed on Jun. 12, 2015, which is a 371 application of PCT International Application No. PCT/IB2014/058361 filed on Jan. 17, 2014, which claims priority to U.S. Provisional Application No. 61/754,269, filed on Jan. 18, 2013. The entire contents of these earlier filed applications are hereby incorporated by reference in its entirety.

BACKGROUND

Field

Embodiments of the invention generally relate to wireless communication systems, such as, but not limited to, the Universal Mobile Telecommunications System (UNITS) Terrestrial Radio Access Network (UTRAN), Long Term Evolution (LTE) Evolved UTRAN (E-UTRAN), and/or LTE-Advanced (LTE-A).

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN) no RNC exists and most of the RNC functionalities are contained in the eNodeB (evolved Node B, also called E-UTRAN Node B).

Long Term Evolution (LTE) or E-UTRAN refers to improvements of the UMTS through improved efficiency and services, lower costs, and use of new spectrum opportunities. In particular, LTE is a 3rd generation partnership project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD). Advantages of LTE are, for example, high throughput, low latency, FDD and TDD support in the same platform, an improved end-user experience, and a simple architecture resulting in low operating costs.

Further releases of 3GPP LTE (e.g., LTE Rel-11, LTE-Rel-12) are targeted towards future international mobile telecommunications advanced (IMT-A) systems, referred to herein for convenience simply as LTE-Advanced (LTE-A). LTE-A is directed toward extending and optimizing the 3GPP LTE radio access technologies. A goal of LTE-A is to provide significantly enhanced services by means of higher data rates and lower latency with reduced cost. LTE-A will be a more optimized radio system fulfilling the international telecommunication union-radio (ITU-R) requirements for IMT-Advanced while keeping the backward compatibility.

SUMMARY

One embodiment is directed to a method including configuring a first node for joining a first synchronization group with a second node on a lowest stratum, receiving at least one synchronization signal comprising information on at least an identity of the second node, and synchronizing the first node to the first synchronization group based on the synchronization signal.

In one embodiment, the synchronization signal comprises an indication of a stratum ordinal, and the stratum ordinal may comprise the lowest ordinal among the at least one synchronization signal from the first synchronization group.

According to an embodiment, the receiving may comprise receiving the at least one synchronization signal from a third node, and the third node may be a member of the first synchronization group.

In an embodiment, the method may further comprise transmitting another synchronization signal comprising an indication of the second node of the first synchronization group. In another embodiment, the method may further comprise reporting synchronization sources, and the synchronization sources may comprise a list of observed strata originating from different macro cells and ordinals of the strata the first node can join.

According to an embodiment, the method may further comprise reporting a node on the lowest stratum to a network or a network device. In an embodiment, the method may further comprise receiving a configuration for the first node to join a second synchronization group, and the configuration may be based on the reporting.

In an embodiment, the second synchronization group may be different from the first synchronization group. According to one embodiment, the method may further comprise reporting resource utilization.

According to another embodiment, the method may further comprise observing a synchronization conflict, and reporting the conflict to a network or a network device. In one embodiment, the first node may be a base station, an enhanced node B, an access point, or a user equipment.

Another embodiment is directed to an apparatus including at least one processor, and at least one memory comprising computer program code. The at least one memory and the computer program code are configured, with the at least one processor, to cause the apparatus at least to configure a first node or the apparatus for joining a first synchronization group with a second node on a lowest stratum, receive at least one synchronization signal comprising information on at least an identity of the second node, and synchronize the first node to the first synchronization group based on the synchronization signal.

In some embodiments, the apparatus may be a unit, device, component, function, and/or means allocated within the first node. In other embodiments, the apparatus may be the first node itself.

Another embodiment is directed to a computer program embodied on a computer readable medium. The computer program is configured to control a processor to perform a process including configuring a first node for joining a first synchronization group with a second node on a lowest stratum, receiving at least one synchronization signal comprising information on at least an identity of the second node, and synchronizing the first node to the first synchronization group based on the synchronization signal.

Another embodiment is directed to an apparatus including means for configuring a first node or the apparatus for joining a first synchronization group with a second node on a lowest stratum, means for receiving at least one synchronization signal comprising information on at least an identity of the second node, and means for synchronizing the first node to the first synchronization group based on the synchronization signal.

Another embodiment is directed to a method including configuring, for example by a network function, a first node for joining a first synchronization group with a second node on a lowest stratum. In one embodiment, the configuring may be based on the first node's reports on synchronization sources or synchronization conflicts. In some embodiments, the network function may run or be comprised in an eNB. In other embodiments, the network function may run or be comprised in a UE (e.g., cluster head).

Another embodiment is directed to an apparatus including at least one processor, and at least one memory comprising computer program code. The at least one memory and the computer program code are configured, with the at least one processor, to cause the apparatus at least to configure a first node for joining a first synchronization group with a second node on a lowest stratum. In one embodiment, the configuring may be based on the first node's reports on synchronization sources or synchronization conflicts. In some embodiments, the apparatus may comprise a network function that may run or be comprised in an eNB. In other embodiments, the apparatus may comprise a network function that may run or be comprised in a UE (e.g., cluster head).

Another embodiment is directed to a computer program embodied on a computer readable medium. The computer program is configured to control a processor to perform a process including configuring, for example by a network function, a first node for joining a first synchronization group with a second node on a lowest stratum. In one embodiment, the configuring may be based on the first node's reports on synchronization sources or synchronization conflicts. In some embodiments, the network function may run or be comprised in an eNB. In other embodiments, the network function may run or be comprised in a UE (e.g., cluster head).

Another embodiment is directed to an apparatus including configuring means for configuring a first node for joining a first synchronization group with a second node on a lowest stratum. In one embodiment, the configuring means may configure the first node based on the first node's reports on synchronization sources or synchronization conflicts. In some embodiments, apparatus may comprise a network function that may run or be comprised in an eNB. In other embodiments, the apparatus may comprise a network function that may run or be comprised in a UE (e.g., cluster head).

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of embodiments of methods, systems, apparatuses, and computer program products for synchronization of cells, as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Certain embodiments of the invention relate to mutual synchronization of small cells, including small cells that are in the presence of multiple synchronization sources provided by macro cells.

Small cell enhancements have been subject to a 3GPP RAN-level study item (SI) and considerations on the small cell scenarios and requirements have been collected in the technical report (TR) 36.932. This TR includes the following statement: "Both synchronized and un-synchronized scenarios should be considered between small cells as well as between small cells and macro cell(s). For specific operations e.g. interference coordination, carrier aggregation and inter-eNB COMP, small cell enhancement can benefit from synchronized deployments with respect to small cell search/measurements and interference/resource management. Therefore time synchronized deployments of small cell clusters are prioritized in the study and new means to achieve such synchronization shall be considered." An example of a system benefitting from synchronized small and macro cells is operating all type of cells at the same carrier and with the time division duplex (TDD) method. An example of a system where small cells layer benefits from synchronization but macro cells are asynchronous is operating small and macro cells on different carriers in the manner that TDD is used with small cells while frequency division duplex (FDD) is used with macro cells.

Figure 1:
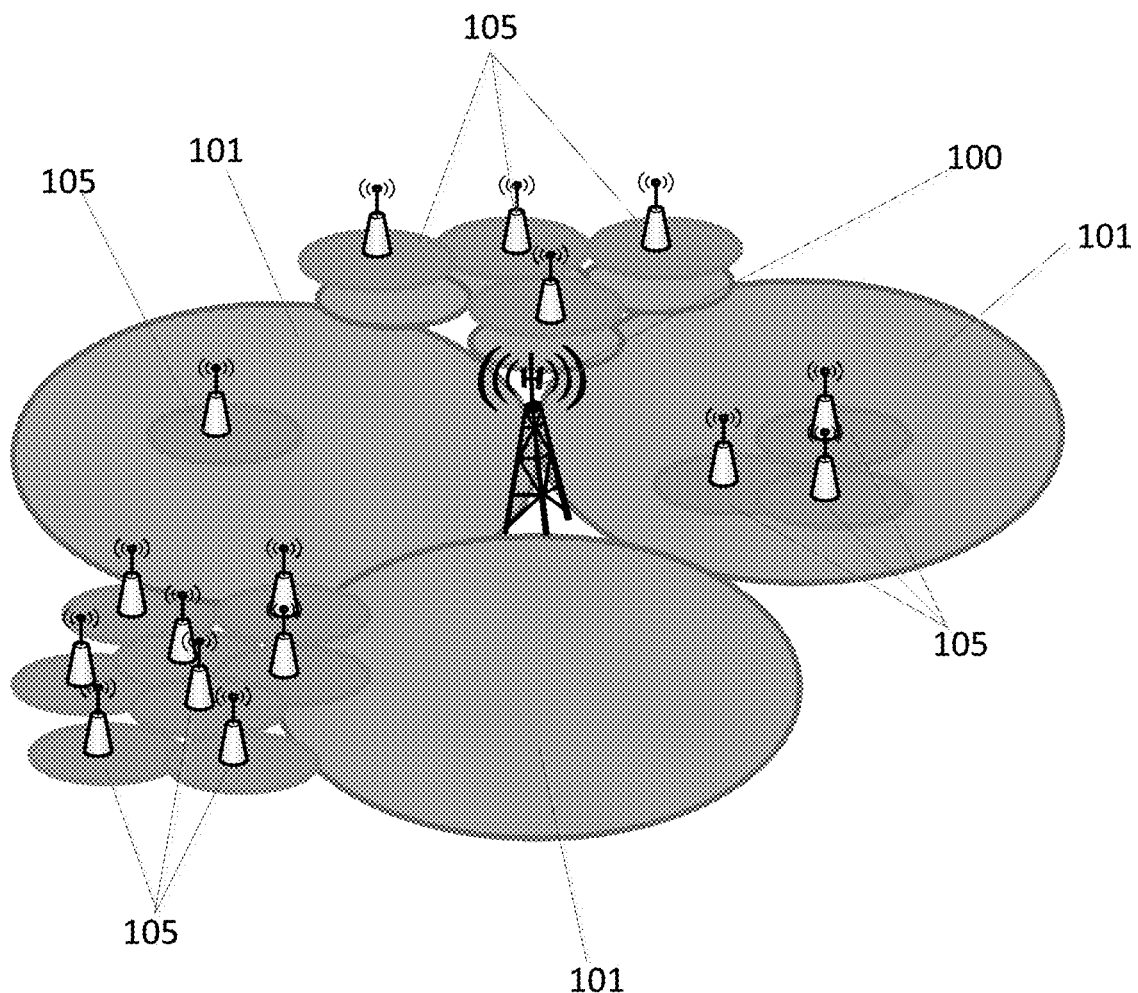
FIG. 1 illustrates a system according to one embodiment.

FIG. 1 illustrates a system including macro cells 101 and small cells 105, according to one embodiment. One scenario of interest, according to certain embodiments, is displayed in the lower left corner of FIG. 1 where a group of small cells 105 are only partly in the coverage area of macro cells 101 of one eNB 100. The small cells 105 that are not on the coverage of the macro cells 101 of eNB 100 could be under the coverage of the macro cells of another eNB or some of them could be without any macro cell coverage or with coverage of multiple macro cells.

One solution that has been considered for the synchronization of TDD home eNodeBs (HeNBs) is stratified over-the-air synchronization. According to this solution, the lowest stratum is the macro cells that are assumed to be synchronized, for instance by a global navigation satellite system (GNSS), the second lowest stratum are the small cells that are able to synchronize directly to a macro cell by listening the macro cell's signal, and, generally, a cell on stratum N can synchronize to a cell on stratum N−1 but not to any cell on a stratum below N−1. It has been assumed that macro cells are synchronized or small cells are isolated inside a macro cell. Therefore, this method does not provide solution in the case of asynchronous macro cells. Furthermore, these earlier considerations were done for co-channel macro and small cells, in which the synchronization between small and macro cells is essential.

Some embodiments consider the case where small and macro cells are on different bands (or carriers). Accordingly, it may not be essential to maintain common timing in the macro and small cells, but small cells within a macro cell can join a small cell group that is mainly under another macro cell.

There are multiple examples of distributed synchronization methods, i.e., methods where synchronization is obtained without an external synchronization source. One example is WiFi independent basic service set (IBSS) synchronization that is based on over-the-air exchange of time stamps in such a manner that a node adopts the timing of another node if the other node's time is later than the node's own time. That method could be used for synchronizing locally a layer of small cells.

In view of the above, small cell synchronization can pose a number of challenges. For example, small cells are not equipped with global positioning system (GPS) receivers or they are deployed outside the coverage of GPS signals, e.g., indoors. Also, backhaul connections of the small cells cannot always be assumed to be suitable for utilizing precision time protocol. In the absence of GPS receivers and good enough backhaul, cell synchronization could be based on signals that are received over-the-air from other cells, as it has been proposed for the synchronization of TDD HeNBs. However, macro cells cannot always provide a coherent time reference because the small cells to be synchronized may hear different asynchronous macro cells. Macro cells on an FDD band are typically assumed to be asynchronous.

Figure 2:
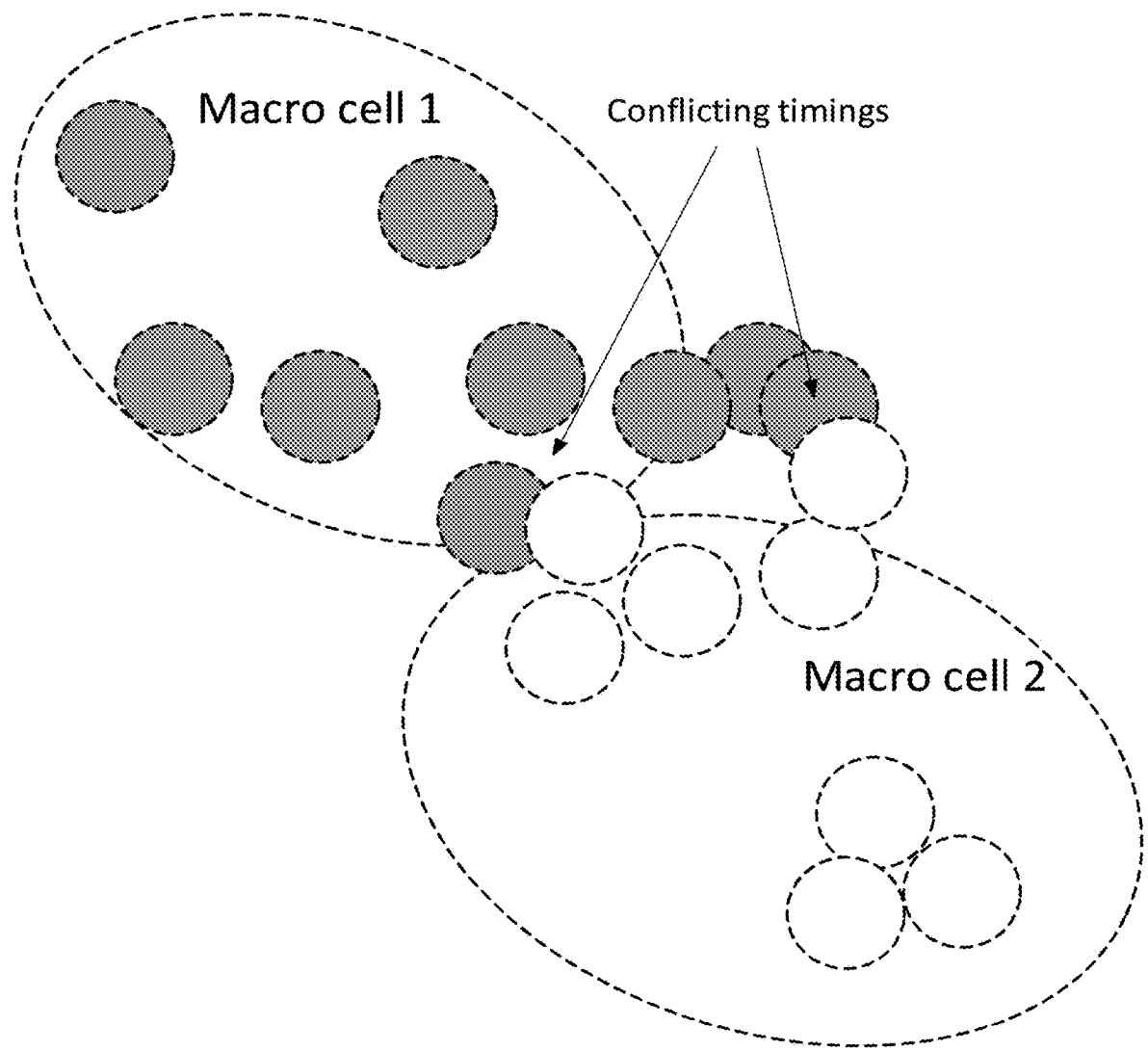
FIG. 2 illustrates a system according to another embodiment.

FIG. 2 illustrates an example of a system where over-the-air synchronization is assumed and the synchronization configuration of small cells is shown in the presence of asynchronous macro cells 1 and 2. It would be natural to specify that small cells synchronize to the macro cell with the strongest signal or, when lacking a macro cell signal, to the small cell at lowest stratum. However, such an approach would not allow any steering of the small cell synchronization, which would be completely defined by the deployment of the cells. Therefore, a more flexible synchronization system would be desirable in order to control how the synchronized groups form such that the effect of conflicting small cell synchronizations are avoided or minimized. In the example of FIG. 2, specifying that a small cell synchronizes to the macro cell with the strongest signal or to a small cell at the lowest stratum leads to synchronization conflicts between small cells as some adjacent small cells belong to different synchronization groups that are depicted by the different colors in the figure. In this example, a better grouping would be such that all the small cells, except the three separated cells in the coverage of macro cell 2, would belong to the same synchronization group. The three cells could form a different synchronization group because of their separation from the rest of the small cells.

Certain embodiments of the invention include procedures and signaling for controlling cell synchronization, for example, in the presence of multiple synchronization sources. Some embodiments relate to cells being configured with a preference list of synchronization sources, cells broadcasting information of their source of synchronization, cells reporting observations on synchronization sources, as well as a synchronization conflict resolving method.

Figure 3A:
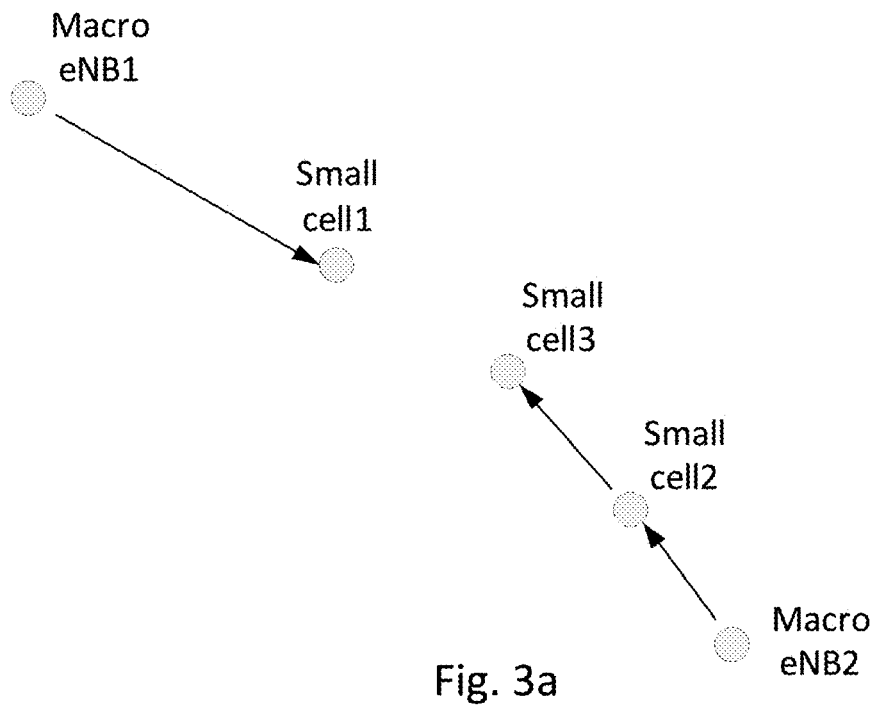
FIGS. 3a and 3b illustrate a system according to another embodiment.
Figure 3B:
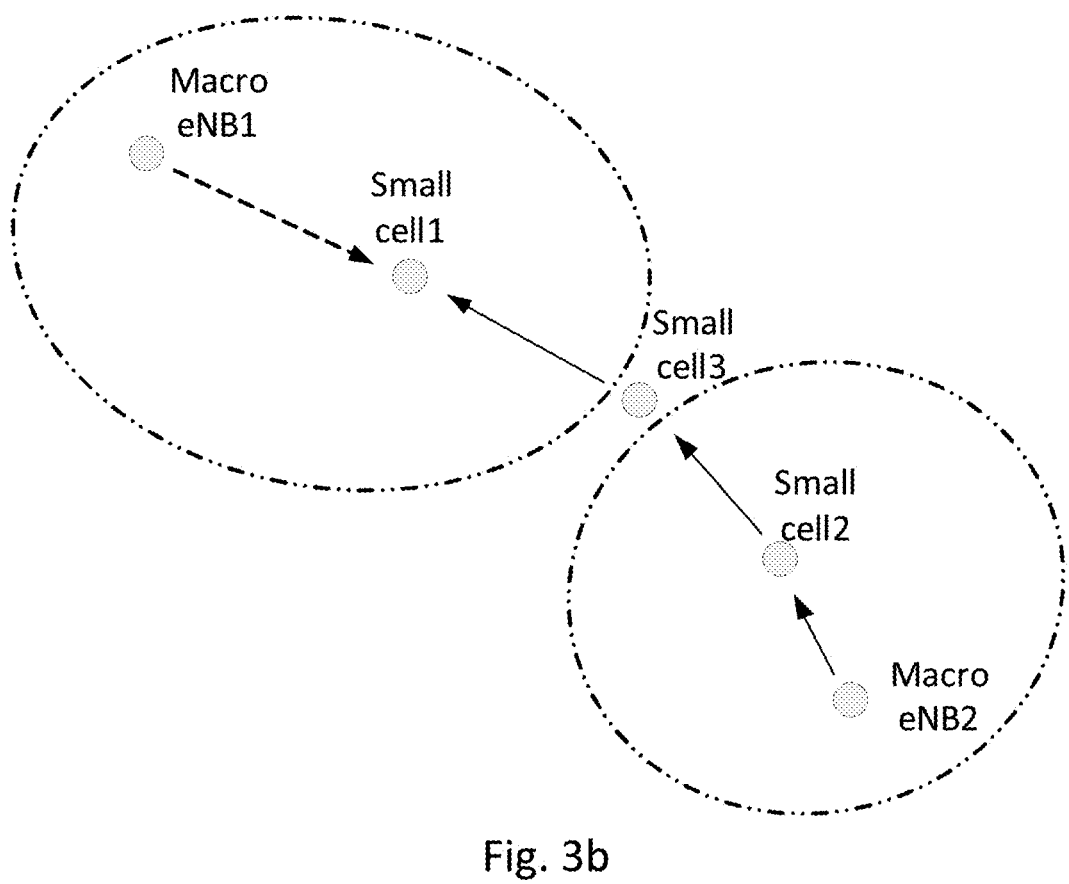

One aspect of the invention modifies the above proposed stratified synchronization system in such a way that the small cells can be instructed to join a synchronization group with a particular cell on the lowest stratum. FIGS. 3a and 3b illustrate synchronization of small cells in the presence of asynchronous macro cells that are formed by different eNBs.

An example of conventional stratified synchronization of three small cells in the presence of two macro eNBs is illustrated in FIG. 3a, where the lines with arrow heads are drawn from the source of synchronization. Assuming the small cells 1 and 2 can hear macro cells formed by eNBs 1 and 2 respectively, correspondingly, they synchronize to each of those macro cells covered by eNBs 1 and 2 because, conventionally, the source of synchronization should be a node on the lowest heard stratum. Small cell 3 might not hear any macro cells and could then synchronize, for example, to small cell 2. If the macro cells were not synchronized, the neighboring cells 1 and 3 would be asynchronous. Accordingly, in the example of FIG. 3a, the small cells synchronize to the cell with lowest stratum. The situation can be improved if the network can configure the small cells to synchronize, directly or through strata, to a certain macro cell. The small cells would then indicate, for example via synchronization signal, their stratum ordinal and also the identity of the synchronization source on the lowest stratum.

An improved synchronization configuration is shown in FIG. 3b. The small cell 1 has been configured to join preferably the stratified synchronization with macro eNB2 on the lowest stratum. Therefore, if it hears small cell 3, it chooses that as a synchronization source although that would lead it to the fourth lowest stratum instead of the second lowest that would have been provided by synchronization to eNB1. The configuration of FIG. 3b could be desired, for instance, if the three small cells were coupled strongly together but to a lesser extent to the small cells in the surroundings. This could be the case, for instance, if the three small cells were indoors in the same building or were deployed for a hotspot without other small cells in the vicinity.

Accordingly, one embodiment provides a preference list of synchronization sources to cells. In an embodiment, instead of just a single most preferred timing reference, the preference list could contain multiple, mutually synchronized sources on the same preference level.

Another embodiment is directed to deployment of the small cells with the best macro cell on the lowest stratum. In some cases, for example with small cells in an office building or shopping mall, the operator could know rather well the coverage of macro cells within the small cell covered region, and could base selection of the preferred macro cell on this prior knowledge by, for example, choosing the macro cell covering the largest number of small cells as the reference with highest preference.

However, utilizing only prior knowledge may not always be sufficient, and reaching the optimal configuration could require small cell measurements and creating a report about the possible synchronization sources. For instance, such a report could include a list of the observed strata originating from different macro cells and the corresponding ordinals of the strata the small cell could join. Based on the signaling, the network could keep a record on the relative timings of the small cells, advise a small cell to join the most suitable synchronization group, and optimize the use of frequency and carrier resources for mitigating the effect of conflicting timings.

The approach of controlling the formation of synchronization groups can be generalized to all kinds of synchronization procedures. For instance, instead of the selection between synchronization groups with different macro cells in the lowest stratum (like in FIGS. 3a and b), the selection could as well be between a group of cells maintaining stratified synchronization and another group of cells maintaining distributed synchronization based on, for instance, WiFi IBSS type synchronization method. Another generalization is that also a small cell could be assigned to act as the synchronization source in the lowest stratum.

Figure 4:
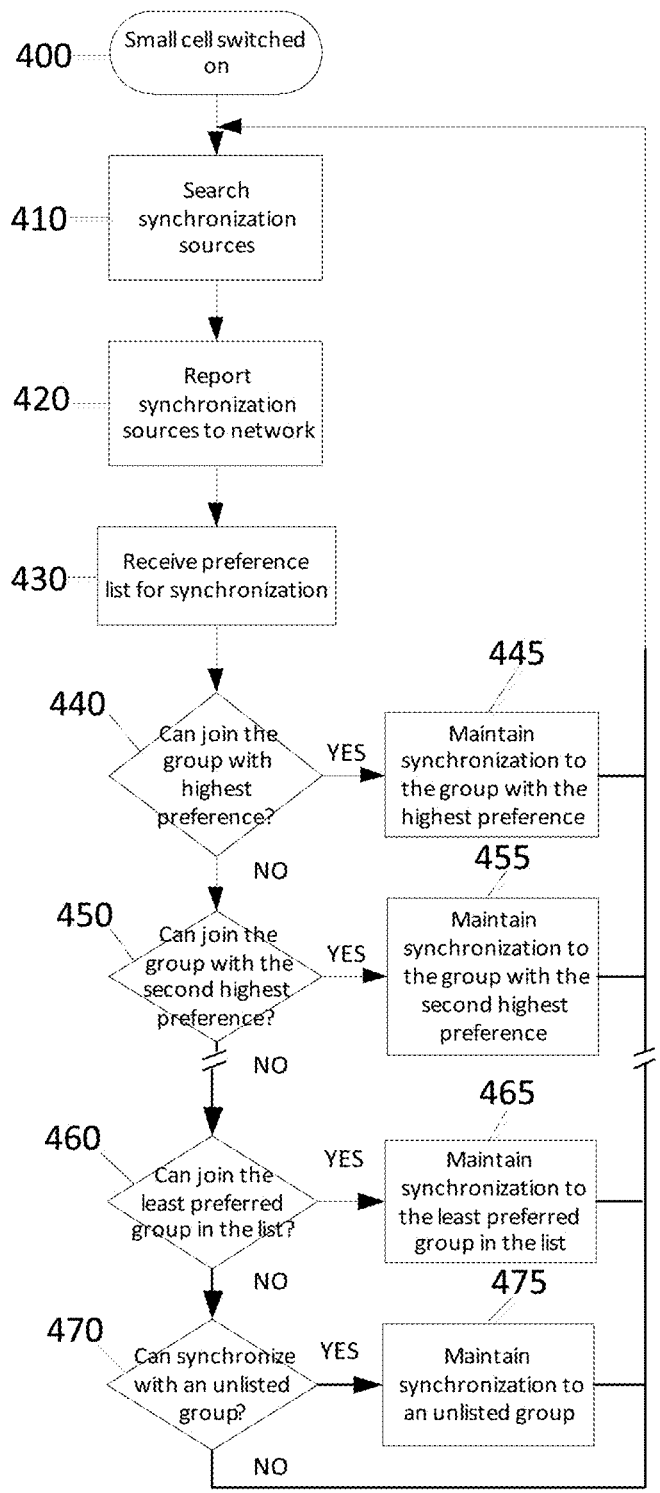
FIG. 4 illustrates a flow diagram of a method according to an embodiment.

FIG. 4 illustrates a flow diagram of an example of a synchronization method, according to one embodiment. In an embodiment, the method of FIG. 4 may be performed by a base station, eNB, and/or access point (AP) for a small cell, for example. As shown in FIG. 4, a small cell is switched on at 400. At 410, the method includes searching for synchronization sources. The method may then include, at 420, reporting the synchronization sources to the network. At 430, the method includes receiving a preference list for synchronization.

In certain embodiments, the step of reporting synchronization sources to network, at 420, may be optional. As a result, in some embodiments, the preference list may be updated even without any preceding reporting.

When the preference list is made, several factors may be taken into account besides the information reported by a cell at step 420. There may be prior knowledge about the possible synchronization sources based on knowledge of the location of cells. Cells in a dense group could be preferably configured with the same most preferred synchronization source. On the other hand, even neighboring small cells could in some cases be configured with different most preferred synchronization source if it is seen reasonable to make a border of two synchronization groups between the two cells. Configuring a cell with a preference list containing sources on several preference levels could be important if the cell is located on the coverage border region of macro cells. The highest priority could be given for the macro cell where most of the small cells in the neighborhood can synchronize to while lower priorities are given for other macro cells that the cell might be able to synchronize to if for instance interference occasionally prevents synchronization to the most preferred source.

Returning to FIG. 4, at 440, it is determined whether the cell can join the group with the highest preference from the preference list. If it can, at 445, the cell maintains the synchronization to the group with the highest preference from the preference list. If it cannot join the group with the highest preference from the preference list, then, at 450, it is determined whether the cell can join the group with the second highest preference from the preference list. If it can, at 455, the cell maintains the synchronization to the group with the second highest preference from the preference list. If it cannot join the group with the second highest preference from the preference list, the method continues with the cell attempting to join the group with the next highest preference until at 460, it is determined whether the cell can join the group with the lowest preference from the preference list. If it can, at 465, the cell maintains the synchronization to the group with the lowest preference from the preference list. If none of the preferred and listed synchronization groups can be joined, at 470, it is determined whether the cell can synchronize with an unlisted group. If it can synchronize with an unlisted group, at 475, the cell may join to an unlisted synchronization group that could maintain synchronism with a stratified synchronization method or with a distributed method, such as WiFi IBSS mode synchronization. If it is determined that it cannot synchronize with an unlisted group, the method returns to step 410.

After a cell has joined to a synchronization group at steps 445, 455, 465, or 475, it may from time to time return to the step 410 of searching synchronization sources in order check if changes have taken place. Such changes may happen, for instance, when new small cells are deployed to the system or earlier deployed cells are switched on or off, or when cell coverage areas are tuned or changing when load and interference level are changing in the system. The return to searching of synchronization sources 410 may take place periodically as configured by the network, or be triggered by the network when changes are supposed to take place, or be based on an event observed by the synchronizing cell. An example of an event causing the return to step 410 is the cell losing the connection to its synchronization group. Another example is the cell observing severe synchronization conflict either directly, or based on UE reporting or by over-the-air or backhaul signaling from other cells.

According to an embodiment, each small cell that can act as a synchronization source may broadcast information about its stratum, as well as the macro eNB used as the reference. Such information can be included, for example, in a physical broadcast channel (PBCH) or similar channel, or else transmitted using physical downlink shared channel (PDSCH) resources. In this case, the utilized PDSCH resources can be pre-defined or scheduled using proper identifiers.

According to an embodiment, in order to save radio resources, a small cell may send information on its stratum and synchronization reference through backhaul instead of broadcasting. A small cell hearing another small cell could contact the other cell through backhaul to ask the other cell's information or to send its own information to the other cell.

There may be situations where synchronization cannot be achieved within the small cell cluster due to deployment characteristics and configuration of preferred synchronization sources. For example, if the small cell 1 in FIG. 3b is configured to use macro eNB1 as preferred synchronization source, while small cell 3 is configured to use macro eNB2 as the preferred synchronization source, then a conflict exists. In this case, small cell 1 can send synchronization reports to macro eNB1 indicating this conflict, and corresponding action can be taken in the network to handle it, for example, reconfiguring any of the small cells in FIG. 3b to use a common synchronization source.

Figure 5:
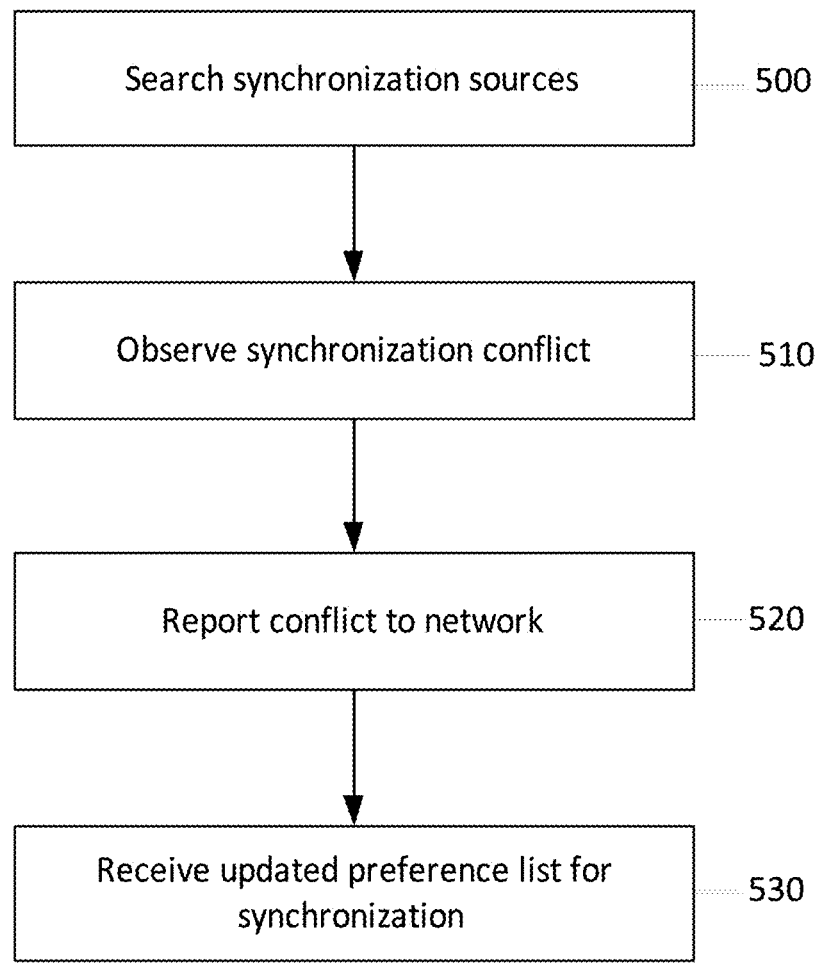
FIG. 5 illustrates a flow diagram of a method according to another embodiment.

FIG. 5 illustrates a flow diagram of a method for reporting and resolving synchronization conflicts, according to one embodiment. The method may include, at 500, searching for synchronization sources. At 510, the method includes observing a synchronization conflict and, at 520, reporting the conflict to the network. The method may also include, at 530, receiving an updated preference list for synchronization.

In some situations this conflict resolution procedure may not be possible, for example, if the Macro eNBs in FIGS. 3a and 3b belong to different operators, which are sharing the spectrum for the small cells. In order to handle these remaining conflicts, the small cells can transmit information about their resource utilization, either together with the synchronization information or as a separate message. The resource utilization can include the frequency resources utilized by the small cell, such as which carriers are utilized. This information can be included in the synchronization reports sent to each corresponding macro eNB, which in turn can utilize this information for interference management.

Hence, the information broadcast or sent through backhaul by small cells can, for example, include:
For synchronization:
Stratum number
Reference macro cell used for synchronization
Optional, for interference management in critical synchronization situations:
Resource utilization
Transmit power
Maximum transmit power
Information contained in the synchronization report can, for example, include:
ID of identified small cells, together with:
Stratum number
Reference macro cell used for synchronization
Resource utilization
Received power, estimated path loss, or similar It should be noted that many combinations are possible for the report, according to different embodiments. For example, the small cells may order the detected small cells according to their reference macro eNBs and report only the most relevant small cell in each group. As another example, in case two small cells are detected in strata 1 and 2, both using macro eNB2 as reference, the report may include only the small cell belonging to stratum 1. Other small cells using other Macro eNBs as reference would still be included in the report.

In an embodiment, if the synchronization group selection method is generalized to also cover selection between stratified and distributed synchronization systems, the broadcast information and synchronization report would indicate the synchronization method used by the cells.

While the description above focuses on the roles of eNBs in the synchronization and conflict reporting, the UEs may also provide assistance, in particular in identifying and reporting synchronization conflicts. For example, the UE may be required to listen to neighboring cells and report to the network the synchronization report. This can be particularly useful if the synchronization groups are loosely connected, implying that the eNBs may not be able to decode each other signals but UEs on cell edge could receive signals from two or more cells belonging to different synchronization groups. Such reporting could be periodical or triggered by the network.

The information on the synchronization reports may also be used by the eNB receiving the reports to adjust its own synchronization according to synchronization groups reported by the UEs.

In some embodiments, the functionality of any of the methods described herein, such as those illustrated in FIGS. 4 and 5 discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Figure 6A:
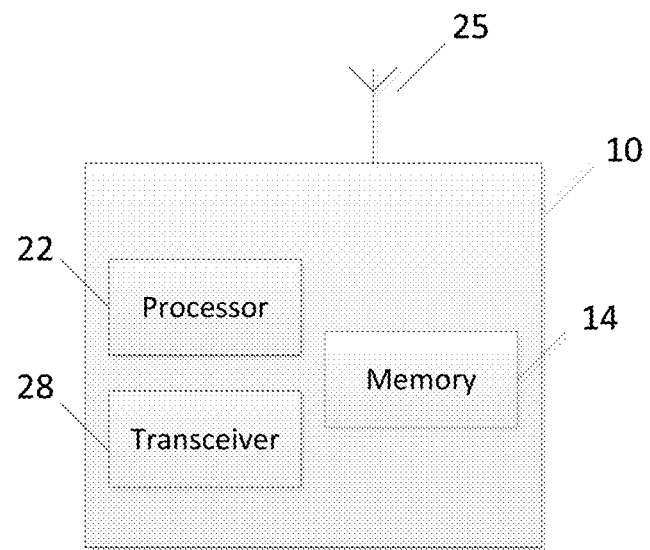
FIG. 6a illustrates an apparatus according to one embodiment.

FIG. 6a illustrates an example of an apparatus 10 according to an embodiment. In one embodiment, apparatus 10 may be a base station (BS), such as an eNB, or access point (AP). It should be noted that one of ordinary skill in the art would understand that apparatus 10 may include components or features not shown in FIG. 6a. Only those components or feature necessary for illustration of the invention are depicted in FIG. 6a.

As illustrated in FIG. 6a, apparatus 10 includes a processor 22 for processing information and executing instructions or operations. Processor 22 may be any type of general or specific purpose processor. While a single processor 22 is shown in FIG. 6a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas 25 for transmitting and receiving signals and/or data to and from apparatus 10. Apparatus 10 may further include a transceiver 28 configured to transmit and receive information. For instance, transceiver 28 may be configured to modulate information on to a carrier waveform for transmission by the antenna(s) 25 and demodulates information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

As mentioned above, according to one embodiment, apparatus 10 may be a BS or AP. In an embodiment, apparatus 10 may be controlled, by memory 14 and processor 22, to search for synchronization sources, report the synchronization sources to the network, receive a preference list of synchronization sources from the network, determine a group with the highest preference from the preference list that can be joined, and join the determined group. If it is determined that none of the groups listed in the preference list can be joined, apparatus 10 may be controlled, by memory 14 and processor 22, to join an unlisted group.

Figure 6B:
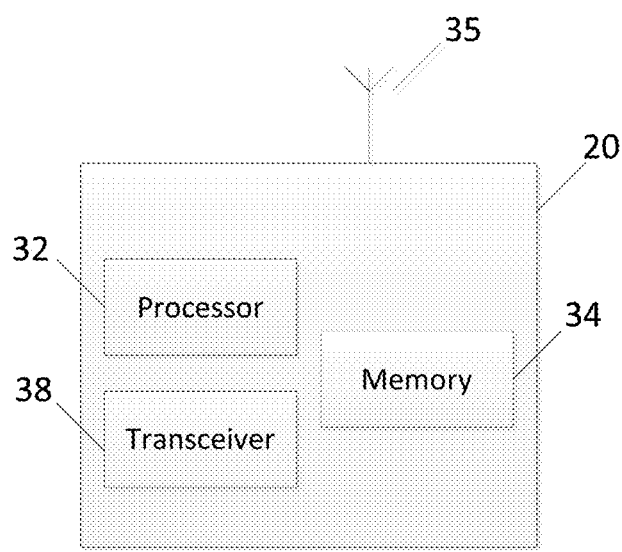
FIG. 6b illustrates an apparatus according to another embodiment.

FIG. 6b illustrates an example of an apparatus 20 according to another embodiment. In an embodiment, apparatus 20 may be network element. It should be noted that one of ordinary skill in the art would understand that apparatus 20 may include components or features not shown in FIG. 6b. Only those components or feature necessary for illustration of the invention are depicted in FIG. 6b.

As illustrated in FIG. 6b, apparatus 20 includes a processor 32 for processing information and executing instructions or operations. Processor 32 may be any type of general or specific purpose processor. While a single processor 32 is shown in FIG. 6b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulates information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a network element. In this embodiment, apparatus 20 may be controlled by memory 34 and processor 32 to receive information, from one or more small cells, about stratum number and macro eNB(s) used as reference for synchronization. Apparatus 20 may then be controlled by memory 34 and processor 32 to create a preference list including a ranking of the preference of the groups, and to send the preference list to the small cell(s).

One embodiment is directed to a method for synchronization. The method may include searching for synchronization sources, and reporting the synchronization sources to the network. The method may further include receiving a preference list of synchronization sources from the network. The method may also include determining a group with a highest preference that can be joined from the preference list, and joining the determined group. The method can include, if it is determined that none of the groups listed in the received preference list can be joined, joining an unlisted group.

Another embodiment is directed to a synchronization method including receiving information about stratum number and macro eNB(s) used as reference for synchronization from one or more small cells. The method may then include creating a preference list including a ranking of the preference of the groups, and sending the preference list to the small cell(s).

Another embodiment is directed to a synchronization conflict reporting and resolving method. The method may include searching for synchronization sources, observing a synchronization conflict, and reporting the conflict to the network. The method may also include receiving an updated preference list for synchronization.

Another embodiment is directed to an apparatus including at least one processor and at least one memory including computer program code. The at least one memory and the computer program code may be configured, with the at least one processor, to cause the apparatus at least to search for synchronization sources, report the synchronization sources to the network, and receive a preference list of synchronization sources from the network. The at least one memory and the computer program code may be further configured, with the at least one processor, to cause the apparatus at least to determine a group with a highest preference that can be joined from the preference list, and join the determined group. If it is determined that none of the groups listed in the received preference list can be joined, the apparatus may be controlled to join an unlisted group.

Another embodiment is directed to an apparatus including at least one processor and at least one memory including computer program code. The at least one memory and the computer program code may be configured, with the at least one processor, to cause the apparatus at least to receive information about stratum number and synchronization source(s) used as reference for synchronization from one or more small cells, create preference lists including a ranking of the preference of the groups, and send the preference lists to the small cell(s).

Another embodiment is directed to an apparatus including at least one processor and at least one memory including computer program code. The at least one memory and the computer program code may be configured, with the at least one processor, to cause the apparatus at least to search for synchronization sources, observe a synchronization conflict, report the conflict to the network, and receive an updated preference list for synchronization.

In view of the above, certain embodiments provide flexibility for steering small cell synchronization when different synchronization sources are available. Embodiments can provide a simpler and more stable method because each cell only needs to follow timing of a single cell, instead of exchanging time stamps with multiple cells the way that is done, for example, in the WiFi IBSS mode synchronization.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   determining which one of a plurality of possible synchronisation sources to use as a synchronisation source, based at least partly on information about an identity of a synchronisation group to which the possible synchronisation sources belong,
   wherein the determining comprises selecting a possible synchronisation source of a more preferred synchronisation group over a possible synchronisation source of a less preferred synchronisation group, wherein a stratum of the possible synchronisation source of the more preferred synchronisation group is higher than a stratum of the possible synchronisation source of the less preferred synchronisation group.

2. The method according to claim 1, wherein said information about the identity of the synchronisation group comprises the identity of the synchronization source on a lowest stratum of the synchronisation group.

3. The method according to claim 2, further comprising obtaining information about the identity of the synchronization source on the lowest stratum of the synchronisation group for a detected synchronization source from transmissions of the detected synchronization source.

4. The method according to claim 2, further comprising obtaining information about the identity of the lowest stratum of the synchronisation group for a possible synchronisation source from information received through backhaul.

5. A computer program, embodied on a non-transitory computer readable medium, the computer program configured to control a processor to perform a method according to claim 1.

6. An apparatus, comprising:
   at least one processor; and
   at least one memory including computer program code,
   wherein the at least one memory and the computer program code are configured, with the at least one processor, to cause the apparatus at least to
   determine which one of a plurality of possible synchronisation sources to use as a synchronisation source, based at least partly on information about an identity of a synchronisation group to which the possible synchronisation sources belong,
   wherein the determining comprises selecting a possible synchronisation source of a more preferred synchronisation group over a possible synchronisation source of a less preferred synchronisation group, wherein a stratum of the possible synchronisation source of the more preferred synchronisation group is higher than a stratum of the possible synchronisation source of the less preferred synchronisation group.

7. The apparatus according to claim 6, wherein said information about the identity of the synchronisation group comprises the identity of the synchronization source on a lowest stratum of the synchronisation group.

8. The apparatus according to claim 7, wherein the at least one memory and the computer program code are configured, with the at least one processor, to cause the apparatus at least to obtain information about the identity of the synchronization source on the lowest stratum of the synchronisation group for a detected synchronization source from transmissions of the detected synchronization source.

9. The apparatus according to claim 7, wherein the at least one memory and the computer program code are configured, with the at least one processor, to cause the apparatus at least to obtain information about the identity of the lowest stratum of the synchronisation group for a possible synchronisation source from information received through backhaul.

10. A method, comprising:
    broadcasting information about an identity of a synchronisation group to which a possible synchronisation source belongs, for selection of a synchronisation source at one or more nodes, wherein said selection is based at least partly on said information about the identity,
    wherein the possible synchronization source comprises a possible synchronisation source of a more preferred synchronisation group over a possible synchronisation source of a less preferred synchronisation group, wherein a stratum of the possible synchronisation source of the more preferred synchronisation group is higher than a stratum of the possible synchronisation source of the less preferred synchronisation group.

11. The method according to claim 10, wherein said information about the identity of the synchronisation group comprises the identity of the synchronization source on a lowest stratum of the synchronisation group.

12. A computer program, embodied on a non-transitory computer readable medium, the computer program configured to control a processor to perform a method according to claim 10.

13. An apparatus, comprising:
    at least one processor; and
    at least one memory including computer program code,
    wherein the at least one memory and the computer program code are configured, with the at least one processor, to cause the apparatus at least to
    broadcast information about an identity of a synchronisation group to which a possible synchronisation source belongs, for selection of a synchronisation source at one or more nodes, wherein said selection is based at least partly on said information about the identity,
    wherein the possible synchronization source comprises a possible synchronisation source of a more preferred synchronisation group over a possible synchronisation source of a less preferred synchronisation group, wherein a stratum of the possible synchronisation source of the more preferred synchronisation group is higher than a stratum of the possible synchronisation source of the less preferred synchronisation group.

14. The apparatus according to claim 13, wherein said information about the identity of a synchronisation group comprises the identity of the synchronization source on a lowest stratum of the synchronisation group.

* * * * *